United States Patent
Sano et al.

(10) Patent No.: US 10,035,141 B2
(45) Date of Patent: Jul. 31, 2018

(54) AEI ZEOLITE CONTAINING PHOSPHORUS AND PRODUCTION METHOD THEREFOR

(71) Applicants: TOSOH CORPORATION, Yamaguchi (JP); HIROSHIMA UNIVERSITY, Hiroshima (JP)

(72) Inventors: Tsuneji Sano, Hiroshima (JP); Masahiro Sadakane, Hiroshima (JP); Yasuyuki Takamitsu, Yamaguchi (JP)

(73) Assignees: TOSOH CORPORATION, Yamaguchi (JP); HIROSHIMA UNIVERSITY, Hiroshima (JP)

( * ) Notice: Subject to any disclaimer, the term of this patent is extended or adjusted under 35 U.S.C. 154(b) by 0 days.

(21) Appl. No.: 14/903,355

(22) PCT Filed: Jul. 9, 2014

(86) PCT No.: PCT/JP2014/068264
§ 371 (c)(1),
(2) Date: Jan. 7, 2016

(87) PCT Pub. No.: WO2015/005369
PCT Pub. Date: Jan. 15, 2015

(65) Prior Publication Data
US 2016/0144347 A1    May 26, 2016

(30) Foreign Application Priority Data

Jul. 10, 2013 (JP) ................................ 2013-144581
Dec. 20, 2013 (JP) ................................ 2013-263965
May 7, 2014 (JP) ................................ 2014-096156

(51) Int. Cl.
| | | |
|---|---|---|
| B01J 29/85 | (2006.01) | |
| C01B 39/54 | (2006.01) | |
| B01D 53/86 | (2006.01) | |
| B01J 37/08 | (2006.01) | |
| C01B 39/02 | (2006.01) | |
| C01B 39/48 | (2006.01) | |
| C01B 37/08 | (2006.01) | |

(52) U.S. Cl.
CPC .......... B01J 29/85 (2013.01); B01D 53/8628 (2013.01); B01J 37/08 (2013.01); C01B 37/08 (2013.01); C01B 39/026 (2013.01); C01B 39/48 (2013.01); C01B 39/54 (2013.01); *B01D 2255/20761* (2013.01); *B01D 2255/50* (2013.01); *B01J 2229/186* (2013.01)

(58) Field of Classification Search
CPC ..................................................... B01J 29/85
See application file for complete search history.

(56) References Cited

U.S. PATENT DOCUMENTS

| | | | | |
|---|---|---|---|---|
| 5,958,370 A * | 9/1999 | Zones | .................... | B01D 53/02 208/111.01 |
| 5,958,818 A | 9/1999 | Demmel et al. | | |
| 7,008,610 B2 | 3/2006 | Cao et al. | | |
| 2004/0093876 A1* | 5/2004 | Inagaki | ................ | B01J 20/0292 62/112 |
| 2008/0241060 A1 | 10/2008 | Li | | |
| 2010/0092361 A1 | 4/2010 | Li | | |
| 2010/0092362 A1 | 4/2010 | Li | | |
| 2010/0179363 A1* | 7/2010 | Brown | ................. | B01J 29/7015 585/639 |
| 2011/0182791 A1* | 7/2011 | Fedeyko | ............ | B01D 53/9436 423/237 |

FOREIGN PATENT DOCUMENTS

| | | |
|---|---|---|
| JP | 2010-522688 | 7/2010 |
| JP | 2010-260777 | 11/2010 |
| WO | 2008/118434 | 10/2008 |

OTHER PUBLICATIONS

Crystal Structure of Zeolite Y as a Function of Ion Exchange James A. Kaduk The Rigaku Journal, vol. 12, No. 2, pp. 14-34, 1995.*
Facile Synthesis of AEI Zeolites by Hydrothermal Conversion of FAU Zeolites in the Presence of Tetraethylphosphonium Cations Toshihiro Maruo et al. Chem. Lett. vol. 43, pp. 302-304, 2014 but released on the web Nov. 12, 2013.*
"Chemical Communications", 2012, pp. 8264-8266, vol. 48.
E.R. Parnham et al., "The Ionothermal Synthesis of Cobalt Aluminophosphate Zeolite Frameworks", J.Am.Chem.Soc, Feb. 22, 2006, pp. 2204-2205, vol. 125, No. 7.
J. Am. Chem. Soc. , 2000, pp. 263-273, No. 122.
Search Report issued e in PCT/JP2014/068264, dated Oct. 21, 2014.
International Preliminary Examination Report in PCT/JP2014/068264 dated Jan. 21, 2016.
M. Moliner et al. The Royal Society of Chemistry, 2012, "Electronic Supplementary Information (ESI)".
European Search Report dated Feb. 13, 2017.

* cited by examiner

*Primary Examiner* — Douglas B Call
(74) *Attorney, Agent, or Firm* — Greenblum & Bernstein, P.L.C.

(57) ABSTRACT

Provided is AEI zeolite having a uniform acid strength of an appropriate degree. AEI zeolite comprising phosphorus, preferably AEI zeolite comprising phosphorus in the pores, and a method for producing AEI zeolite comprising a crystallization step of crystallizing a raw material mixture containing a tetraethylphosphonium cation.

14 Claims, 3 Drawing Sheets

AEI ZEOLITE CONTAINING PHOSPHORUS AND PRODUCTION METHOD THEREFOR

TECHNICAL FIELD

Incorporation of Basis Applications by Reference

All of the content of the specifications, scopes of patent claims, drawings, and abstracts of Japanese Patent Application No. 2013-144581 filed on Jul. 10, 2013, Japanese Patent Application No. 2013-263965 filed on Dec. 20, 2013, and Japanese Patent Application No. 2014-096156 filed on May 7, 2014 are cited here and incorporated as a disclosure of the specification of the present invention.

The present invention relates to AEI zeolite containing phosphorus and a production method therefor. More specifically, the present invention relates to AEI zeolite containing phosphorus suitable for a catalyst or base material thereof, and a production method therefor.

BACKGROUND ART

AEI zeolite is a crystalline aluminosilicate which is expected to be used in various catalyst applications such as catalysts for olefin production (Patent Literature 1). AEI zeolite has a structure similar to that of CHA zeolite. Due to these facts, AEI zeolite is also expected to be used as a selective catalytic reduction catalyst (so-called SCR catalyst) (Non-Patent Literature 1).

As of the present, the following have been reported as specific AEI zeolite.

Patent Literature 1 is the first report relating to AEI zeolite. Patent Literature 1 discloses SSZ-39 obtained with an N,N-diethyl-2,6-dimethylpiperidinium cation as a structure-directing agent.

Patent Literature 2 discloses SSZ-39 obtained using aluminum nitrate and TEOS (tetraethyl orthosilicate) as raw materials and an N,N-diethyl-2,6-dimethylpiperidinium cation as a structure-directing agent, in the presence of hydrogen fluoride.

Non-Patent Literature 1 discloses SSZ-39 obtained using sodium silicate and USY zeolite as raw materials and a N,N-diethyl-3,5-dimethylpiperidinium cation as a structure-directing agent.

Non-Patent Literature 2 discloses that SSZ-39 is obtained only when certain structure-directing agents of cyclic quaternary ammonium cations are used and the molar ratio of the raw materials $SiO_2/Al_2O_3$ is 30.

However, in the AEI zeolites reported up to now, the acid site has not been modified and acid strength is too high. In catalyst applications such as hydrocarbon conversion catalysts, side reactions tend to occur with catalysts of which the acid strength is too high.

Additionally, in the AEI zeolites, a cyclic quaternary ammonium cation must be used as a structure-directing agent. However, cyclic quaternary ammonium cations used in the production of SSZ-39 are not generally distributed. For this reason, industrial application of production methods using such structure-directing agents has been difficult. Additionally, in production methods of AEI zeolite up to now, yield and productivity have been low.

CITATION LIST

Patent Literature

Patent Literature 1: U.S. Pat. No. 5,958,370, specification
Patent Literature 2: U.S. Pat. No. 7,008,610, specification

Non-Patent Literature

Non-Patent Literature 1: Chemical Communications Vol. 48, 8264-8266 (2012)
Non-Patent Literature 2: Journal of American Chemical Society, No. 122, 263-273 (2000)

SUMMARY OF THE INVENTION

Technical Problem

In light of these problems, an object of the present invention is to provide AEI zeolite having an appropriate acid strength. An another object of the present invention is to a provide production method by which such AEI zeolite is industrially obtained. Yet another object of the present invention is to provide a catalyst containing such AEI zeolite.

Solution to Problem

The present inventors conducted diligent research on AEI zeolite. As a result, they discovered that uniformly including phosphorus in AEI zeolite is effective for changing the acid strength of the AEI zeolite. They also discovered that such AEI zeolite is obtained without using a cyclic quaternary ammonium cation, and thereby achieved the present invention.

Specifically, the present invention relates to the following.

[1] The present invention is AEI zeolite comprising phosphorus.

[2] Here, it is preferred that the AEI zeolite according to [1] above comprises phosphorus in pores.

[3] Furthermore, in the AEI zeolite according [1] or [2] above, the molar ratio of phosphorus relative to framework metal is preferably not less than 0.001 and not greater than 0.1, and more preferably not less than 0.005 and not greater than 0.045.

[4] Additionally, in the AEI zeolite according to any one of [1] to [3] above, the molar ratio of silica relative to alumina is preferably not less than 10 and not greater than 35.

[5] Additionally, in the AEI zeolite according to any one of [1] to [4] above, the BET specific surface area is preferably not less than 400 $m^2/g$.

[6] Furthermore, the AEI zeolite according to any one of [1] to [5] above may comprise a transition metal.

[7] The transition metal of the AEI zeolite according to [6] above is at least any one of iron and copper.

[8] Here, the molar ratio of transition metal relative to aluminum of the AEI zeolite according to any one of [1] to [7] above is preferably not less than 0.1 and not greater than 0.5.

[9] Furthermore, in the AEI zeolite according to any one of [1] to [8] above, the average primary particle size is preferably not less than 0.1 μm and not greater than 3 μm.

[10] Next, the present invention relates to a method for producing the AEI zeolite described in any one of [1] to [9] above, comprising a crystallization step of crystallizing a raw material mixture containing a tetraethylphosphonium cation and FAU crystalline aluminosilicate having a lattice constant of not less than 24.30 Å.

[11] Here, a compound containing a tetraethylphosphonium cation in the method for producing AEI zeolite according to [10] above is at least one selected from the group consisting of tetraethylphosphonium hydroxide, tetraethylphosphonium bromide, and tetraethylphosphonium chloride.

[12] Furthermore, the FAU crystalline aluminosilicate in the method for producing AEI zeolite according to [10] or [11] above is Y zeolite.

[13] The method for producing AEI zeolite according to any one of [10] to [12] above of the present invention may comprise a step of heat-treating the AEI zeolite in a non-oxidizing environment.

[14] Here, the non-oxidizing environment in the method for producing AEI zeolite according to [13] above is any of a nitrogen environment and an environment containing from 1 to 10 volume % hydrogen.

[15] Next, the present invention relates to a catalyst comprising the AEI zeolite described in any one of [1] to [9] above.

[16] Next, the present invention relates to a nitrogen oxide reduction catalyst comprising the AEI zeolite described in any one of [1] to [9] above.

[17] Next, the present invention relates to a method of reducing nitrogen oxide comprising a step of using the AEI zeolite described in any one of [1] to [9] above.

Advantageous Effects of Invention

The present invention can provide AEI zeolite having an appropriate acid strength. Additionally, in the AEI zeolite of the present invention, phosphorus is uniformly present in the pores. For this reason, the present invention can provide AEI zeolite having an appropriate acid strength as a whole.

Additionally, because the AEI zeolite of the present invention has an appropriate acid strength, it is anticipated to be used as a catalyst for lower olefin production from alcohols and ketones, a cracking catalyst, a dewaxing catalyst, an isomerization catalyst, and a nitrogen oxide reduction catalyst.

The AEI zeolite of the present invention is suitable particularly as a catalyst used at high temperature such as a nitrogen oxide reduction catalyst.

Additionally, the production method of the present invention can produce AEI zeolite at high yield without using cyclic quaternary ammonium, and can provide a more industrial method for producing AEI zeolite.

Additionally, in the production method of the present invention, AEI zeolite can be crystallized at higher yield by not using an amorphous silica source and alumina source.

DESCRIPTION OF EMBODIMENTS

Figure 1:
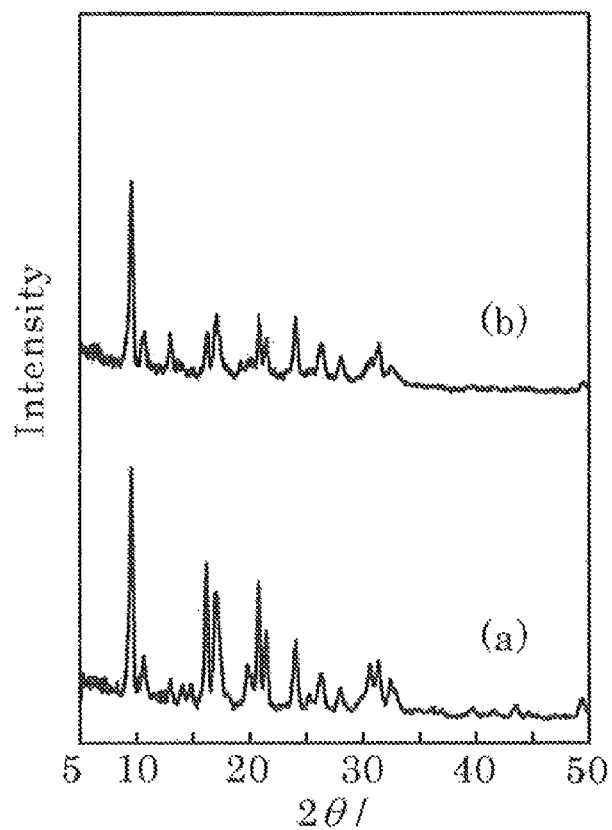
FIG. 1 is an XRD pattern of AEI zeolite of Example 1 [(a) after synthesis, (b) after calcining].

The AEI zeolite of the present invention will be described in detail below.

The AEI zeolite of the present invention has an AEI structure. An AEI structure is a crystal structure resulting in the AEI structure according to the structure code defined by the International Zeolite Association (IZA).

Furthermore, the AEI zeolite of the present invention is crystalline aluminosilicate having an AEI structure, and is preferably SSZ-39. Crystalline aluminosilicate has framework metals ("T-atoms" hereinafter) of aluminum (Al) and silicon (Si), and has a framework structure composed of a network of these and oxygen (O). Therefore, zeolite analogs such as aluminophosphates and silicoaluminophosphates having an AEI structure and having a framework structure composed of a network containing phosphorus (P) in its T-atoms differ from the AEI zeolite of the present invention.

The AEI zeolite of the present invention contains phosphorus. As a result, the acid strength of the AEI zeolite of the present invention is of a suitable degree. Phosphorus is contained outside the AEI zeolite framework—that is, not as a T-atom. For example, phosphorus is contained in the pores of the AEI zeolite, particularly in the pores of eight-membered oxygen rings. Note that when phosphorus is contained in pores, that phosphorus sometimes forms a chemical bond with the framework oxygen of the AEI zeolite. In this case, the bond between the phosphorus in the pores and the framework oxygen is a partially chemical bond. This chemical bond differs from the chemical bond between the T-atoms and the framework oxygen atoms. Specifically, a T-atom forms a chemical bond with four framework oxygen atoms, whereas a phosphorus atom in a pore forms a chemical bond with one to three framework oxygen atoms.

The form of phosphorus contained in the AEI zeolite of the present invention is at least one form selected from the group consisting of phosphorus ions, phosphate ions, and phosphorous compounds.

The phosphorus content is not greater than 0.10 as a molar ratio relative to T-atoms ("P/T ratio" hereinafter). As a result, the distribution of phosphorus in the AEI zeolite of the present invention tends to be uniform. The P/T ratio must be not less than 0.001, and if it is not less than 0.01, it tends to have acid strength suitable for various catalyst applications.

The P/T ratio is not less than 0.005, not less than 0.01, not less than 0.015, or further, not less than 0.02. The P/T ratio is not greater than 0.09, not greater than 0.05, not greater than 0.035, or further, not greater than 0.03. The P/T ratio must be not less than 0.001 and not greater than 0.01. On the other hand, since characteristics when used as a catalyst tend to be better, the P/T ratio is preferably not less than 0.005 and not greater than 0.05, more preferably not less than 0.005 and not greater than 0.045, even more preferably not less than 0.01 and not greater than 0.035, yet more preferably not less than 0.015 and not greater than 0.035, and yet more preferably not less than 0.02 and not greater than 0.03.

Here, the T-atoms in the AEI zeolite of the present invention are the metals contained in the framework thereof, namely Si and Al.

The molar ratio of silica relative to alumina in the AEI zeolite of the present invention ("$SiO_2/Al_2O_3$ ratio" hereinafter) is preferably not less than 10, more preferably not less than 15, and even more preferably not less than 18. By the $SiO_2/Al_2O_3$ ratio being not less than 10, heat resistance of the AEI zeolite of the present invention tends to be high. On the other hand, if the $SiO_2/Al_2O_3$ ratio is not greater than 100, not greater than 50, not greater than 35, or further, not greater than 25, the AEI zeolite of the present invention has acid sites sufficient for a catalyst.

In general, fluorine contained in zeolite originates from the raw materials. Zeolite obtained using a compound containing fluorine as a raw material tends to have a high production cost. For this reason, the AEI zeolite of the present invention preferably contains substantially no fluorine (F)—that is, the fluorine content is preferably 0 ppm. Considering the measurement limit of values obtained by typical component analysis methods such as lanthanum-alizarin complexone absorptiometry, the fluorine content of the AEI zeolite of the present invention may be exemplified as not greater than 100 ppm.

The specific surface area of the AEI zeolite of the present invention is not less than 300 m²/g, or further, not less than 350 m²/g. The higher the BET specific surface area, the higher the catalytic activity when used as a catalyst or the like. The BET specific surface area is preferably not less than 400 m²/g, more preferably not less than 420 m²/g, and even more preferably not less than 450 m²/g. Furthermore, if the BET specific surface area is not less than 500 m²/g, not less than 505 m²/g, or further, not less than 510 m²/g, the distribution of phosphorus in the pores of AEI zeolite tends to be more uniform and the AEI zeolite of the present invention tends to have higher catalytic activity.

When the AEI zeolite of the present invention is made into metal-containing AEI zeolite, any transition metal may be contained. When the AEI zeolite of the present invention is used as a nitrogen oxide reduction catalyst, the transition metal contained is preferably at least any one of copper (Cu) and iron (Fe), and copper is more preferred. Furthermore, when used as an ethanol conversion catalyst, the transition metal contained is preferably iron (Fe), lanthanum (La), zirconium (Zr), or tungsten (W).

In a metal-containing AEI zeolite, the molar ratio of transition metal relative to aluminum ("M/Al ratio" hereinafter) contained in the AEI zeolite is not less than 0.1, and preferably not less than 0.13, and more preferably not less than 0.15. This molar ratio is preferably not greater than 0.5 and more preferably not greater than 0.25.

Furthermore, the primary particle size of the AEI zeolite of the present invention is preferably not less than 0.1 μm and not greater than 3 μm. For this reason, the average primary particle size is also cited as not less than 0.1 μm and not greater than 3 μm. Additionally, the larger the average primary particle size, the higher the catalytic characteristics such as nitrogen oxide reduction rate in the early period of use, and the lower the decrease of catalytic performance during use. For example, when the AEI zeolite of the present invention is used as a nitrogen oxide reduction catalyst, if its average primary particle size is not less than 0.8 μm, the nitrogen oxide reduction rate in early use in the low-temperature region of about 200° C. tends to be higher. If the average primary particle size is not less than 1 μm, the AEI zeolite of the present invention tends to result in a nitrogen oxide reduction catalyst having a particularly high nitrogen oxide reduction rate in the lower-temperature region below 200° C.

Here, the primary particle size is the diameter of independent particles of the smallest unit observed by electron microscope, and the average primary particle size is the average of the primary particle size of at least 100 primary particles randomly selected using an electron microscope. Thus, the secondary particle size or average secondary particle size, which is the diameter of secondary particles formed by aggregation of a plurality of primary particles, differs from the primary particle size or average primary particle size. Additionally, the shape of the primary particles is preferably a cubic crystal. The particle shape of the AEI zeolite of the present invention may be a cubic crystal shape or a twin crystal in which these have been conjugated.

Next, the production method of the AEI zeolite of the present invention will be described.

The AEI zeolite of the present invention may be obtained by a production method comprising a crystallization step of crystallizing a raw material mixture containing a tetraethylphosphonium cation and FAU crystalline aluminosilicate having a lattice constant of not less than 24.30 Å.

In conventional methods for producing AEI zeolite, a cyclic quaternary ammonium cation was required as a structure-directing agent ("SDA" hereinafter). That is, AEI zeolite was obtained only by using a cyclic quaternary ammonium cation. In contrast, in the production method of the present invention, AEI zeolite may be obtained using a less expensive SDA without requiring a cyclic quaternary ammonium cation.

In the crystallization step, a raw material mixture containing a tetraethylphosphonium cation ("TEP" hereinafter) is crystallized. TEP not only has the function of an SDA, but also serves as a phosphorus source. Additionally, TEP is more easily procured than cyclic quaternary ammonium cations. For this reason, it is a more industrial production method of AEI zeolite than a production method that uses a cyclic quaternary ammonium cation as an SDA.

As the TEP source contained in the raw material mixture, a compound containing TEP, or further, at least one type selected from the group consisting of TEP sulfates, nitrates, halides, and hydroxides may be cited. More specifically, at least one type selected from the group consisting of tetraethylphosphonium hydroxide ("TEPOH" hereinafter), tetraethylphosphonium bromide ("TEPBr" hereinafter), and tetraethylphosphonium chloride ("TEPCl" hereinafter) is preferred as the TEP source, among which TEPOH is more preferred.

The raw material mixture must contain, in addition to the TEP source, a silica source, an alumina source, an alkali source, and water.

The silica source and the alumina source contained in the raw material mixture are crystalline aluminosilicate (zeolite). Crystalline aluminosilicate has a crystal structure with regularity. It is thought that by treating the crystal aluminosilicate in the presence of TEP, crystallization proceeds while the regularity of the crystal structure is maintained to an appropriate degree. For this reason, due to the silica source and the alumina source being crystalline aluminosilicate, AEI zeolite can be more efficiently crystallized than when the silica source and the alumina source are individual compounds or when the silica source and the alumina source are a non-crystalline compound.

To obtain single-phase AEI zeolite, the crystalline aluminosilicate is FAU zeolite, preferably at least any one of X zeolite and Y zeolite, and more preferably Y zeolite.

The lattice constant of the crystalline aluminosilicate is not less than 24.30 Å, or further, not less than 24.31 Å. If crystalline aluminosilicate having a lattice constant less than 24.30 Å is used as the silica source and alumina source, single-phase AEI zeolite is not obtained, and a type of zeolite other than AEI zeolite, such as MFI zeolite or BEA zeolite, is obtained.

The lattice constant must be not greater than 24.5 Å, or further, not greater than 24.45 Å because AEI zeolite having a high $SiO_2/Al_2O_3$ ratio is readily obtained.

Note that in the present invention, the lattice constant may be determined by analysis using pattern analysis of the XRD pattern obtained by powder X-ray diffraction ("XRD" hereinafter). More specifically, the lattice constant may be determined by pattern fitting of the measured XRD pattern in the range of 2θ=5 to 70°.

The molar ratio of silica relative to alumina ($SiO_2/Al_2O_3$ ratio) of the crystalline aluminosilicate must be on the same order as the $SiO_2/Al_2O_3$ ratio of the targeted AEI zeolite.

The $SiO_2/Al_2O_3$ ratio of the crystalline aluminosilicate may be not less than 1.25, or further, may be not less than 10, not less than 15, or further, not less than 18. On the other hand, the $SiO_2/Al_2O_3$ ratio must be not greater than 100, not greater than 50, not greater than 35, or further, not greater than 25.

The specific surface area of the crystalline aluminosilicate is preferably not less than 300 $m^2/g$. By the specific surface area of the crystalline aluminosilicate being not less than 300 $m^2/g$, the generation of zeolite other than AEI zeolite tends to be suppressed. By the specific surface area being not less than 400 $m^2/g$, crystallization of AEI zeolite is accelerated, and by being not less than 500 $m^2/g$, single-phase AEI zeolite is more readily obtained. The specific surface area of the crystalline aluminosilicate does not have to be higher than required as long as single-phase AEI zeolite is obtained. For this reason, not greater than 800 $m^2/g$, or further, not greater than 700 $m^2/g$ may be cited as the specific surface area.

The crystalline aluminosilicate contained in the raw material mixture may be of any cation type. The cation type of the crystalline aluminosilicate contained in the raw material mixture may be at least one type selected from the group consisting of sodium type (Na type), proton type ($H^+$ type), and ammonium type ($NH_4$ type), where proton type is preferred.

Silica sources or alumina sources may not be contained as long as crystalline aluminosilicate is contained. Furthermore, from the perspective of AEI zeolite crystallization efficiency, the raw material mixture preferably does not contain a non-crystalline silica source or a non-crystalline alumina source, and more preferably, it does not contain a silica source or an alumina source other than crystalline aluminosilicate.

Additionally, hydroxides containing an alkali metal may be cited as the alkali source. More specifically, it is a hydroxide containing at least one type selected from the group consisting of lithium, sodium, potassium, rubidium, and cesium, or a hydroxide containing at least sodium or potassium, or further, a hydroxide containing sodium. Additionally, when the silica source and the alumina source contain an alkali metal, that alkali metal may also serve as an alkali source.

Purified water may be used as the water, but each of the raw materials may also be used in the form of an aqueous solution.

The raw material mixture contains these raw materials, and preferably has the following composition.

The molar ratio of silica relative to alumina ($SiO_2/Al_2O_3$ ratio) must be not less than 10, or not less than 15, or further, not less than 18. On the other hand, the $SiO_2/Al_2O_3$ ratio must be not greater than 100, not greater than 50, not greater than 35, or further, not greater than 25.

The molar ratio of alkali metal cation relative to silica ("alkali/$SiO_2$ ratio" hereinafter) is not less than 0.01, or further, not less than 0.05. On the other hand, the alkali/$SiO_2$ ratio must be not greater than 0.5, not greater than 0.3, or further, not greater than 0.1.

The molar ratio of TEP relative to silica ("TEP/$SiO_2$ ratio" hereinafter) is not less than 0.01, or further, not less than 0.05. On the other hand, the TEP/$SiO_2$ ratio is not greater than 0.5, or further, not greater than 0.2.

The molar ratio of OH relative to silica ("OH/$SiO_2$ ratio" hereinafter) is less than 0.5, or further, not greater than 0.3. By the OH/$SiO_2$ ratio being less than 0.5, AEI zeolite may be obtained at higher yield. The OH/$SiO_2$ ratio of the raw material mixture is normally not less than 0.1.

If the molar ratio of water ($H_2O$) relative to silica ("$H_2O$/$SiO_2$ ratio" hereinafter) is not greater than 20, or further, not greater than 15, AEI zeolite may be obtained with greater efficiency. To make a raw material mixture that has an appropriate fluidity, the $H_2O/SiO_2$ ratio must be not less than 3, or further, not less than 5.

The following may be cited as a particularly preferred raw material composition.

$SiO_2/Al_2O_3$ ratio: not less than 10 and not greater than 35
Alkali/$SiO_2$ ratio: not less than 0.01 and not greater than 0.3
TEP/$SiO_2$ ratio: not less than 0.01 and not greater than 0.2
OH/$SiO_2$ ratio: not less than 0.1 and not greater than 0.3
$H_2O/SiO_2$ ratio: not less than 3 and not greater than 20

Note that when the raw material mixture includes a compound containing fluorine, its production cost tends to increase. For this reason, the raw material mixture preferably contains substantially no fluorine (F).

The raw material mixture in the crystallization step must not contain any cyclic quaternary ammonium cations. However, the crystallization step may one of crystallizing a raw material mixture containing TEP, a quaternary ammonium cation, and FAU crystalline aluminosilicate having a lattice constant of not less than 24.30 Å.

The quaternary ammonium cation functions as an SDA without supplying the phosphorus of the AEI zeolite. By crystallizing a raw material mixture containing quaternary ammonium cation in addition to TEP, AEI zeolite in which the phosphorus content is better controlled may be obtained in the crystallization step. For this reason, the crystallization step of crystallizing a raw material mixture containing TEP, a quaternary ammonium cation, and FAU crystalline aluminosilicate having a lattice constant of not less than 24.30 Å is suitable for when producing AEI zeolite in which the phosphorus content is small, for example, AEI zeolite in which the T/P ratio is not greater than 0.045, not greater than 0.030, or further, the P/T ratio is not greater than 0.025. By so doing, the AEI zeolite of the present invention, particularly AEI zeolite having a low phosphorus content, may be produced without a heat treatment step and the associated cost and time.

A piperidinium cation may be cited as the quaternary ammonium cation contained in the raw material mixture. Among piperidinium cations, at least one type selected from the group consisting of an N,N-diethyl-2,6-dimethylpiperidinium cation, an N,N-dimethyl-2,6-dimethylpiperidinium cation, an N-ethyl-N-methyl-2,6-dimethylpiperidinium cation, and an N,N-dimethyl-3,5-dimethylpiperidinium cation is preferred, among which an N,N-diethyl-2,6-dimethylpiperidinium cation is more preferred.

The quaternary ammonium cation source contained in the raw material mixture may be a compound containing a quaternary ammonium cation, or further, at least one type selected from the group consisting of hydroxides, bromides, chlorides, and iodides of a quaternary ammonium cation. The quaternary ammonium cation source is preferably a hydroxide because this suppresses degradation of the reaction equipment. The quaternary ammonium cation source is preferably N,N-diethyl-2,6-dimethylpiperidinium cation hydroxide ("DEDMPOH" hereinafter).

The molar ratio of quaternary ammonium cations relative to silica ("quaternary ammonium cation/SiO$_2$ ratio" hereinafter) may be greater than 0, or further, not less than 0.05. On the other hand, the quaternary ammonium cation/SiO$_2$ ratio must be not greater than 0.5, or further, not greater than 0.2.

The proportion of TEP and quaternary ammonium cations contained in the raw material mixture is discretionary and depends on the targeted phosphorus content of the AEI zeolite. The molar ratio of quaternary ammonium cations relative to TEP and quaternary ammonium cations ("quaternary ammonium cation/(TEP+quaternary ammonium cation)" ratio hereinafter) is greater than 0 mol % and less than 100 mol %, not less than 10 mol % and not greater than 90 mol %, or further, not less than 25 mol % and not greater than 75 mol %.

When the raw material mixture contains a quaternary ammonium cation source, the following may be cited as a preferred raw material mixture composition.

SiO$_2$/Al$_2$O$_3$ ratio: not less than 10 and not greater than 35
Alkali/SiO$_2$ ratio: not less than 0.01 and not greater than 0.3
TEP/SiO$_2$ ratio: not less than 0.01 and not greater than 0.2
Quaternary ammonium cation/SiO$_2$ ratio: not less than 0 and not greater than 0.2
Quaternary ammonium cation/(TEP+quaternary ammonium cation) ratio: not less than 10 mol % and not greater than 90 mol %
OH/SiO$_2$ ratio: not less than 0.1 and not greater than 0.3
H$_2$O/SiO$_2$ ratio: not less than 3 and not greater than 20

Additionally, the following can be cited.

SiO$_2$/Al$_2$O$_3$ ratio: not less than 10 and not greater than 35
Alkali/SiO$_2$ ratio: not less than 0.01 and not greater than 0.3
TEP/SiO$_2$ ratio: not less than 0.01 and not greater than 0.2
DEDMP/SiO$_2$ ratio: not less than 0 and not greater than 0.2
DEDMP/(TEP+DEDMP) ratio: not less than 10 mol % and not greater than 90 mol %
OH/SiO$_2$ ratio: not less than 0.1 and not greater than 0.3
H$_2$O/SiO$_2$ ratio: not less than 3 and not greater than 20

Note that the DEDMP/SiO$_2$ ratio is the molar ratio of DEDMP relative to silica in the raw material mixture, and the DEDMP/(TEP+DEDMP) ratio is the molar ratio of DEDMP related to TEP and DEDMP in the raw material mixture.

In the crystallization step, the raw material mixture containing each of the above raw materials is crystallized by hydrothermal synthesis. In the crystallization process, a hermetically sealed container containing the raw material mixture, and this must be heated.

The raw material mixture crystallizes as long as the crystallization temperature is not less than 100° C. The higher the temperature, the more crystallization is accelerated. For this reason, the crystallization temperature is preferably not less than 130° C., and more preferably not less than 150° C. The crystallization temperature does not have to be higher than necessary as long as the raw material mixture crystallizes. For this reason, the crystallization temperature is preferably not greater than 200° C., not greater than 160° C., and more preferably 150° C. Furthermore, crystallization may be performed in either a state in which the raw material mixture is being mixed or in a state in which it is left still.

The production method of the present invention may also comprise at least any one of a washing step, a drying step, and an ion exchange step ("post-treatment steps" hereinafter) after the crystallization step.

In the washing step, the AEI zeolite and the liquid phase after crystallization are subjected to solid-liquid separation. In the washing step, solid-liquid separation is performed with a known method, and the AEI zeolite obtained as a solid phase must be washed with purified water.

In the drying step, the water content is removed from the AEI zeolite after the crystallization step or after the washing step. The conditions of the drying step are discretionary, but an example is drying the AEI zeolite after the crystallization step or after the washing step by leaving the zeolite to stand for at least two hours in an environment at a temperature not less than 50° C. and not greater than 150° C.

The AEI zeolite after crystallization may have a metal ion such as an alkali metal ion at its ion exchange site. In the ion exchange step, this is exchanged with a non-metal cation such as an ammonium ion (NH$_4^+$) or a proton (H$^+$). Ion exchange to an ammonium ion may be performed by mixing AEI zeolite into an ammonium chloride aqueous solution followed by stirring. Furthermore, ion exchange to a proton may be performed by ion-exchanging AEI zeolite with ammonia and calcining it.

The production method of the present invention preferably comprises at least any one of a heat treatment step or a pyrolysis step after the crystallization step or the post-treatment step.

An example of the heat treatment step is heat-treating AEI zeolite in a non-oxidizing environment ("non-oxidizing heat treatment" hereinafter)—that is, at least any one of an inert environment and a reducing environment. By the heat treatment step, the phosphorus content may be adjusted by decreasing the phosphorus in the AEI zeolite. A more specific example of the non-oxidizing heat treatment is treatment in a nitrogen environment or an environment containing from 1 to 10 vol % hydrogen, at a heat-treatment temperature from 500 to 900° C., or further, 700 to 800° C.

It is preferable to perform the heat treatment step in at least any one of a pressure lower than atmospheric pressure and under non-oxidizing gas flow, and it is more preferable to perform the heat treatment step under non-oxidizing gas flow. By so doing, in addition to phosphorus in the AEI zeolite being more efficiently decreased, the specific surface area of the AEI zeolite tends to increase. Examples of the flow rate (mL/min) of non-oxidizing gas relative to zeolite weight (g) include not less than 20 mL/min/g, not less than 50 mL/min/g, not less than 150 mL/min/g, and further, not less than 200 mL/min/g. Since phosphorus compounds are less likely to be produced in the heat treatment step, the environment in the heat treatment step is preferably under nitrogen flow, and more preferably under nitrogen flow of not less than 200 mL/min/g.

To decrease the phosphorus content in the AEI zeolite even more, it is preferable to perform heat treatment at a pressure below atmospheric pressure. By so doing, phosphorus tends to decrease more than by heat treatment at atmospheric pressure. As the treatment pressure used when performing heat treatment at a pressure lower than atmospheric pressure, in terms of absolute pressure, not greater than 0.1 MPa, not greater than $10^{-3}$ MPa, or further, not greater than $10^{-5}$ MPa may be cited, among which not greater than $10^{-3}$ MPa is preferred. From an industrial perspective, the pressure of heat treatment when below atmospheric pressure can be exemplified as not less than $10^{-5}$ MPa.

The heat treatment time is discretionary, but the longer the heat treatment time is, the higher the specific surface area tends to be. Examples of heat treatment time include not less than 1 hour and not greater than 24 hours, not less than 1 hour and not greater than 12 hours, or further, not less than 3 hours and not greater than 12 hours.

By appropriately controlling the treatment temperature and treatment time of the heat treatment step as well as the treatment environment and treatment pressure, the phosphorus content of the AEI zeolite after the heat treatment step may be finely adjusted.

In the heat pyrolysis step, TEP contained in the AEI zeolite after crystallization is pyrolyzed. As a result, the interaction between the phosphorus contained in the AEI zeolite and the zeolite acid site becomes strong, and the acid strength of the AEI zeolite tends to be mitigated. The AEI zeolite may be calcined by any method as long as it is under conditions under which TEP pyrolyzes. An example of calcining conditions is treatment in the atmosphere (in an air environment) at 500 to 800° C.

Through the pyrolysis step, the interaction between phosphorus and the zeolite acid site becomes strong and the phosphorus in the AEI zeolite tends not to detach. For this reason, the heat treatment step is preferably performed before the pyrolysis step. By performing the pyrolysis treatment after the heat treatment step, phosphorus present in the pores of the AEI zeolite may be efficiently removed.

Furthermore, when adjustment of phosphorus content is unnecessary, the heat treatment step and pyrolysis step do not have to be included.

The AEI zeolite of the present invention has an acid strength of an appropriate degree. For this reason, it can be used as various catalysts such as a catalyst for lower olefin production from alcohols and ketones, a cracking catalyst, a dewaxing catalyst, an isomerization catalyst, and a nitrogen oxide reduction catalyst. Furthermore, in oxidation-reduction catalyst applications such as oxidation catalysts and nitrogen oxide reduction catalysts, the AEI zeolite of the present invention may be used as AEI zeolite containing a transition metal ("metal-containing AEI zeolite" hereinafter) by a transition metal being contained in the AEI zeolite of the present invention.

Additionally, even after performing treatment that exposes the AEI zeolite to a high-temperature, high-humidity environment, the AEI zeolite of the present invention incurs less destruction of the crystal than conventional AEI zeolite. For this reason, the decrease in its catalytic characteristics is small even when the AEI zeolite of the present invention is used in catalyst applications in which a thermal load is incurred, such as fluid catalytic cracking catalysts and nitrogen oxide reduction catalysts.

The acid strength required in the catalyst of the AEI zeolite of the present invention differs depending on the targeted application. Acid strength suited to various catalyst applications may be obtained by adjusting the phosphorus content in the AEI zeolite of the present invention. When used for catalyst applications, the P/T ratio of the AEI zeolite of the present invention is not less than 0.001 and not greater than 0.1, not less than 0.001 and not greater than 0.05, not less than 0.01 and not greater than 0.035, or further, not less than 0.015 and not greater than 0.035.

Additionally, when the AEI zeolite of the present invention is used as metal-containing AEI zeolite, the P/T ratio is not less than 0.001 and not greater than 0.1, not less than 0.001 and not greater than 0.045, not less than 0.005 and not greater than 0.045, not less than 0.005 and not greater than 0.04, not less than 0.01 and not greater than 0.035, not less than 0.015 and not greater than 0.035, or further, not less than 0.02 and not greater than 0.03.

When the AEI zeolite of the present invention is made into metal-containing AEI zeolite, any transition metal may be contained, as described above. When the AEI zeolite of the present invention is used as a nitrogen oxide reduction catalyst, the transition metal contained is preferably at least any one of copper (Cu) and iron (Fe), and copper is more preferred. Furthermore, when used as an ethanol conversion catalyst, the transition metal contained is preferably iron (Fe), lanthanum (La), zirconium (Zr), or tungsten (W).

In a metal-containing AEI zeolite, the molar ratio of transition metal relative to aluminum ("M/Al ratio" hereinafter) contained in the AEI zeolite is not less than 0.1, preferably not less than 0.13, and more preferably not less than 0.15. This molar ratio is preferably not greater than 0.5, and more preferably not greater than 0.25.

The metal-containing AEI zeolite preferably satisfies the following formula (1).

$$(P+nM)/Al \leq 1 \quad (1)$$

In formula (1), P is the amount (mol) of phosphorus in the metal-containing AEI zeolite, M is the amount (mol) of transition metal in the metal-containing AEI zeolite, n is the valence number of the transition metal in the metal-containing AEI zeolite, and Al is the amount (mol) of aluminum in the metal-containing AEI zeolite. The value of n differs depending on the type of transition metal; for example, when the transition metal is copper, n is 2, when it is iron or lanthanum, n is 3, when it is zirconium, n is 4, and when it is tungsten, n is 6.

By formula (1) satisfying the above relationship, all of the cations such as phosphorous cation and transition metal cation contained in the metal-containing AEI zeolite are charge-compensated by the aluminum of the T-atoms. Additionally, by the above M/Al ratio being satisfied and formula (1) being satisfied, a reaction tends not to occur between the aluminum of the T-atoms and the transition metal when the metal-containing AEI zeolite is used as a catalyst. As a result, detachment of aluminum from the zeolite framework accompanying a reaction between the transition metal and aluminum ("de-alumination" hereinafter) tends not to occur. Formula (1) is preferably $(P+nM)/Al \leq 0.9$, more preferably $(P+nM)/Al \leq 0.8$, and more preferably $(P+nM)/Al \leq 0.7$. On the other hand, the lower limit of $(P+nM)/Al$ may be $(P+nM)/Al \geq 0.1$, or further, $(P+nM)/Al \geq 0.3$.

Metal-containing AEI zeolite containing at least any one of copper and iron, or further, containing copper (also called "metal-containing AEI zeolite of the present invention" hereinafter), is more preferably used as a nitrogen oxide reduction catalyst.

Because the metal-containing AEI zeolite of the present invention has at least any one of copper and iron as well as phosphorus, the crystallinity of the zeolite tends not to decrease. As a result, the decrease in nitrogen oxide reduction performance when used for a long period in a high-temperature, high-humidity environment is suppressed, and further, its nitrogen oxide reduction rate after being used in a high-temperature, high-humidity environment is sometimes higher than the nitrogen oxide reduction rate before being used in the high-temperature, high-humidity environment. This effect is striking at low temperatures not greater than 200° C., or further, not greater than 150° C.

Furthermore, in addition to the decrease in nitrogen oxide reduction rate of the metal-containing AEI zeolite of the present invention being suppressed, the nitrogen oxide reduction rate at temperatures from 300 to 500° C. is not less than 70%, or further, a high 80%.

In this manner, because it has a high nitrogen oxide reduction rate in a wide temperature range, the metal-containing AEI zeolite of the present invention may be used as a nitrogen oxide reduction catalyst in applications where the usage temperature varies, such as automotive exhaust catalysts.

Here, as the high-temperature, high-humidity environment, an environment at 900° C. in which air containing 10 vol % $H_2O$ flows at 300 mL/min, and further, an environment at 900° C. in which air containing 10 vol % $H_2O$ relative to the zeolite volume (mL) flows at a flow rate (L) of 6 L/h/mL may be cited. When the time exposed to that environment becomes longer, the thermal load on the zeolite becomes greater. In general, the longer the time exposed to high temperature and high humidity, the more the crystallinity of the zeolite tends to decrease, such as de-aluminization.

Metal-containing AEI zeolite may be obtained by a production method having a metal-containing step of putting the AEI zeolite of the present invention in contact with a transition metal compound.

The metal-containing step must be a method in which the transition metal is contained at least any one of ion exchange sites and pores of the AEI zeolite. As the specific method, at least any one selected from the group consisting of the ion exchange method, evaporation drying, and the impregnation method may be cited, or further, a method in which an aqueous solution containing the transition metal compound and the AEI zeolite are mixed may be cited.

As the transition metal compound, inorganic acid salts of transition metals, or further, at least one type selected from the group consisting of sulfates, nitrates, acetates, and chlorides of transition metals may be cited.

The production method of metal-containing AEI zeolite includes at least one or more steps after the metal-containing step, those steps being selected from a washing step, a drying step, and an activation step.

The washing step may use any washing method as long as it can remove impurities and the like in the metal-containing AEI zeolite. Examples include washing the metal-containing AEI zeolite with a sufficient quantity of purified water.

The drying step removes moisture from the metal-containing AEI zeolite. It can be exemplified as treating the metal-containing AEI zeolite at not less than 100° C. and not greater than 200° C. in air.

The activation step removes organic matter contained in the metal-containing AEI zeolite. It can be exemplified as treating the metal-containing AEI zeolite at greater than 200° C. and not greater than 600° C. in air.

EXAMPLES

The present invention will be described below using examples. However, the present invention is not limited to these examples. Note that "ratio" denotes "molar ratio" unless otherwise noted.

(Identification of Crystal Structure)

The XRD pattern of a sample was measured using a general X-ray diffraction apparatus (apparatus name: MiniFlex, manufactured by Rigaku Corp.). Using a CuKα beam (λ: 1.5405 Å) as a radiation source, measurement was performed in the measurement range of 2θ from 5° to 50°.

Figure 2:
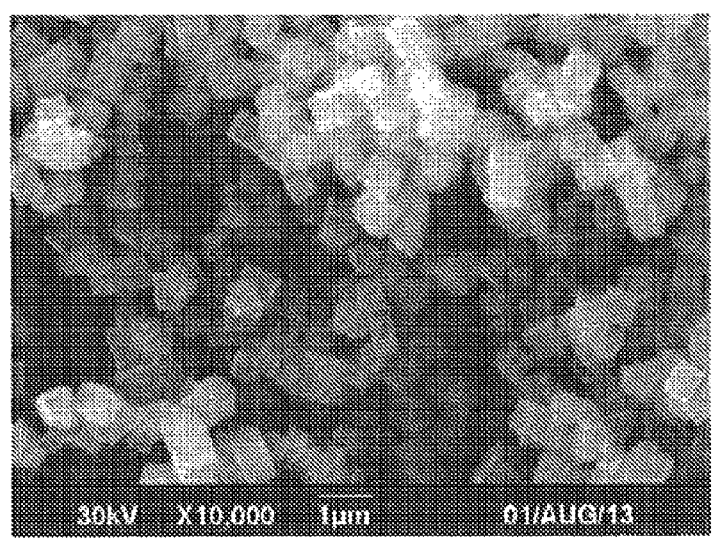
FIG. 2 is a scanning electron microscope photograph of the AEI zeolite of Example 1.

The structure of the sample was identified by comparing the obtained XRD pattern and the XRD pattern shown in FIG. 2 (A) of Non-Patent Literature 1.

(Composition Analysis)

A sample solution was prepared by dissolving a sample in a mixed aqueous solution of hydrofluoric acid and nitric acid. Using a general ICP apparatus (apparatus name: OPTIMA 3300DV, manufactured by PerkinElmer Inc.), the sample solution was measured by inductively coupled plasma atomic emission spectrophotometry (ICP-AES).

The $SiO_2/Al_2O_3$ ratio and the P/T ratio of the sample were determined from the obtained measured values of Si, Al, and P.

(Specific Surface Area Measurement)

The specific surface area of a sample was calculated by nitrogen absorption measurement. A general nitrogen absorption apparatus (apparatus name: Flowsorb III 2305, manufactured by Micromeritics Inc.) was used in nitrogen absorption measurement. After pretreating a sample for 2 hours at 300° C. under nitrogen gas flow, the BET specific surface area was measured by the single-point method using a gas containing 30 vol % nitrogen and 70 vol % argon.

(Average Primary Particle Size Measurement Method)

One hundred primary particles were randomly selected by observation with a scanning electron microscope ("SEM" hereinafter), their Feret diameter was measured, and the diameter of the primary particles was determined. The arithmetic mean of the determined diameter of the primary particles was taken as the average primary particle size.

(Lattice Constant Measurement)

The XRD pattern of a sample was obtained by XRD measurement. The XRD measurement conditions were as follows. Note that XRD measurement was performed using a general X-ray diffraction apparatus (apparatus name: Xpert PRO MPD, manufactured by PANalytical B.V.).

Tube voltage: 45 kV
Tube current: 40 mA
X-rays: CuKα (λ: 1.541784 Å)
Measurement range: 5° to 120°
Step width: 0.0167°/step
Count time: 60 sec/step
Irradiation width: 15 mm fixed
Detector: High-speed detector X'Celerator+Ni filter The lattice constant was determined by analyzing the obtained XRD pattern by the pattern analysis. Pattern analysis was performed for angles of 5° to 70° of the XRD pattern using commercially available refinement software (WPPF for Windows, ver. 3.00).

Example 1

Purified water, sodium hydroxide, and FAU zeolite (Y type; cation type: proton type; $SiO_2/Al_2O_3$ ratio: 32; lattice constant: 24.33 Å; specific surface area: 606 m²/g) were added to an aqueous solution of 40% TEPOH (tetraethylphosphonium hydroxide) and mixed to obtain a raw material mixture with the following composition.

$SiO_2/Al_2O_3$ ratio: 32
$Na/SiO_2$ ratio: 0.05
$TEP/SiO_2$ ratio: 0.2
$OH/SiO_2$ ratio: 0.25
$H_2O/SiO_2$ ratio: 5

A hermetically sealed container containing the obtained raw material mixture was left still for 7 days at 150° C., thereby crystallizing the raw material mixture. The raw material mixture after crystallization underwent solid-liquid separation, and after being washed with purified water, it was dried at 70° C. to obtain the zeolite of this example. This zeolite was AEI zeolite composed of a single phase of an AEI structure. The XRD pattern of the AEI zeolite of this example is shown in FIG. 1A.

A SEM photograph of this example is shown in FIG. 2. The AEI zeolite was primary particles having a cubic shape and a particle shape composed of twin crystals in which these were conjugated. The average primary particle size of the cubic shape was 0.66 μm.

Figure 3:
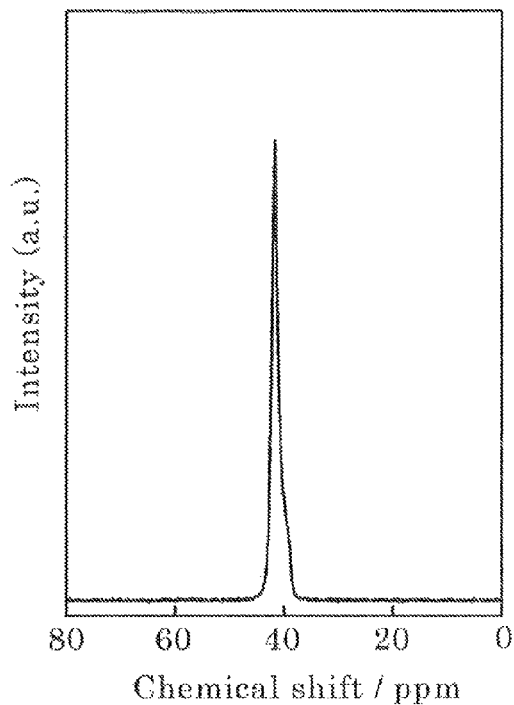
FIG. 3 is a $^{31}$P MAS-NMR spectrum of the AEI zeolite of Example 1.
Figure 4:
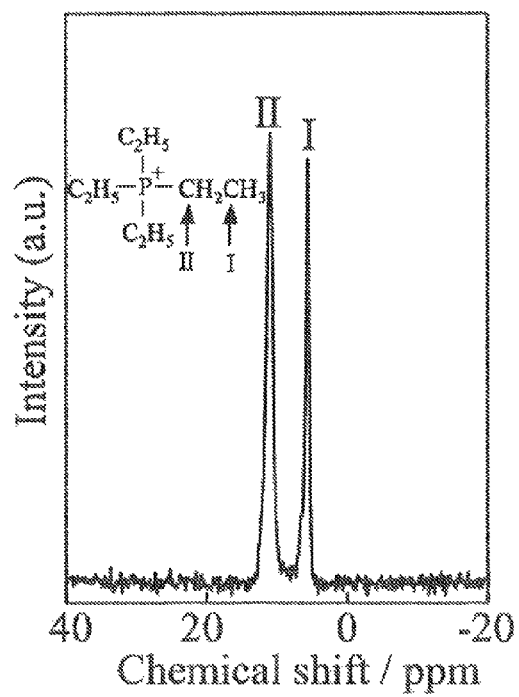
FIG. 4 is a $^{13}$C CP/MAS-NMR spectrum of the AEI zeolite of Example 1.

The results of solid MAS-NMR of the AEI zeolite of this example are shown in FIGS. 3 and 4. From a $^{13}$C CP/MAS NMR spectrum, a peak corresponding to $CH_3$ (I in FIG. 4) and a peak corresponding to $CH_2$ (II in FIG. 4) of a $-P^+-CH_2-CH_3$ bond were ascertained. Additionally, in a $^{31}$P MAS NMR spectrum, it was ascertained that the P bond form was single (FIG. 3). From these results, it was ascertained that in the AEI zeolite of this example, TEP was contained while maintaining the structure thereof, and phosphorus was not present as a T-atom.

The evaluation results of the AEI zeolite of this example are shown in Table 1.

Additionally, the AEI zeolite of this example was calcined for 10 hours at 600° C. in air. From the XRD pattern of the AEI zeolite after calcining, it was ascertained that this AEI zeolite maintained an AEI structure even after calcining. The XRD pattern after calcining is shown in FIG. 1B.

Example 2

The AEI zeolite of this example was obtained by the same method as Example 1 except that as the FAU zeolite, Y zeolite having a proton type as the cation type, a $SiO_2/Al_2O_3$ ratio of 22, a lattice constant of 24.30 Å, and a specific surface area of 661 m$^2$/g was used, and the composition of the raw material mixture was as shown below.

$SiO_2/Al_2O_3$ ratio: 22
$Na/SiO_2$ ratio: 0.1
$TEP/SiO_2$ ratio: 0.2
$OH/SiO_2$ ratio: 0.3
$H_2O/SiO_2$ ratio: 5

Figure 5:
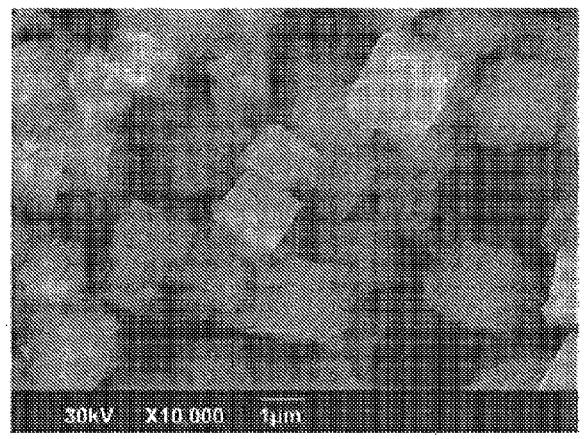
FIG. 5 is a scanning electron microscope photograph of the AEI zeolite of Example 2.

The average primary particle size of the obtained AEI zeolite was 1.4 μm, and the crystal shape was cubic. The evaluation results of the AEI zeolite of this example are shown in Table 1, and a SEM photograph is shown in FIG. 5.

Example 3

The AEI zeolite of this example was obtained by the same method as Example 2 except that as the FAU zeolite, Y zeolite having a $SiO_2/Al_2O_3$ ratio of 23, a lattice constant of 24.33 Å, and a specific surface area of 696 m$^2$/g was used.

Figure 6:
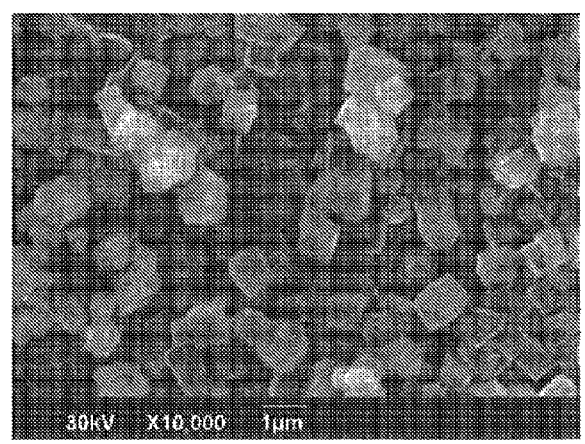
FIG. 6 is a scanning electron microscope photograph of the AEI zeolite of Example 3.

The average primary particle size was 0.80 μm, and the crystal shape was cubic. The evaluation results of the AEI zeolite of this example are shown in Table 1, and a SEM photograph is shown in FIG. 6.

Additionally, the AEI zeolite of this example was calcined for 2 hours at 600° C. in air. In the AEI zeolite after calcining, the $SiO_2/Al_2O_3$ ratio was 18, the P/T ratio was 0.081, and the BET specific surface area was 360 m$^2$/g.

Example 4

The AEI zeolite of this example was obtained by the same method as Example 2 except that as the FAU zeolite, Y zeolite having a $SiO_2/Al_2O_3$ ratio of 26, a lattice constant of 24.32 Å, and a specific surface area of 557 m$^2$/g was used.

The average primary particle size was 0.33 μm, and the crystal shape was cubic. The evaluation results of the AEI zeolite of this example are shown in Table 1.

Example 5

The AEI zeolite of this example was obtained by the same method as Example 2 except that as the FAU zeolite, Y zeolite having a $SiO_2/Al_2O_3$ ratio of 19, a lattice constant of 24.41 Å, and a specific surface area of 382 m$^2$/g was used, and the crystallization time was 14 days.

The average primary particle size was 0.12 μm, and the crystal shape was cubic. The evaluation results of the AEI zeolite of this example are shown in Table 1.

Example 6

The AEI zeolite of this example was obtained by the same method as Example 2 except that as the FAU zeolite, Y zeolite having a $SiO_2/Al_2O_3$ ratio of 32, a lattice constant of 24.33 Å, and a specific surface area of 690 m$^2$/g was used. This zeolite was AEI zeolite composed of a single phase of an AEI structure. The average primary particle size was 0.20 μm, and the crystal shape was cubic. The evaluation results of the AEI zeolite of this example are shown in Table 1.

Example 7

Figure 7:
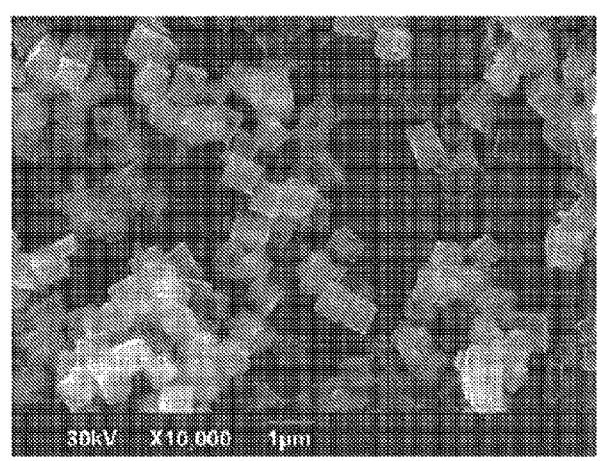
FIG. 7 is a scanning electron microscope photograph of the AEI zeolite of Example 7.

AEI zeolite of this example was obtained by the same method as Example 2 except that the raw material mixture had the following composition. This zeolite was AEI zeolite composed of a single phase of an AEI structure. The average primary particle size was 0.71 μm, and the crystal shape was cubic. A SEM photograph of this example is shown in FIG. 7.

$SiO_2/Al_2O_3$ ratio: 22
$Na/SiO_2$ ratio: 0.05
$TEP/SiO_2$ ratio: 0.2
$OH/SiO_2$ ratio: 0.25
$H_2O/SiO_2$ ratio: 5

Example 8

The AEI zeolite of this example was obtained by the same method as Example 1 except that as the FAU zeolite, Y zeolite having a proton type as the cation type, a $SiO_2/Al_2O_3$ ratio of 15, a lattice constant of 24.30 Å, and a specific surface area of 650 m$^2$/g was used, and the composition of the raw material mixture was as shown below, and the raw material was crystallized while stirring.

$SiO_2/Al_2O_3$ ratio: 15
$Na/SiO_2$ ratio: 0.2
$TEP/SiO_2$ ratio: 0.1
$OH/SiO_2$ ratio: 0.3
$H_2O/SiO_2$ ratio: 10

The average primary particle size was 1.3 μm, and the crystal shape was cubic. The evaluation results of the AEI zeolite of this example are shown in Table 1.

Comparative Example 1

Crystallization was performed by the same method as Example 1 except that as the FAU zeolite, Y zeolite having a $SiO_2/Al_2O_3$ ratio of 29, a lattice constant of 24.29 Å, and a specific surface area of 586 m$^2$/g was used.

The obtained crystal was MFI zeolite. The evaluation results of the MFI zeolite of this comparative example are shown in Tables 1 and 2.

Comparative Example 2

Crystallization was performed by the same method as Example 2 except that as the FAU zeolite, Y zeolite having a $SiO_2/Al_2O_3$ ratio of 28 and a specific surface area of 114 m$^2$/g was used.

Note that the XRD pattern of this Y zeolite did not have the diffraction intensity required to determine the lattice constant. This Y zeolite was almost amorphas Y zeolite having a crystallinity such that the lattice constant could not be determined.

The obtained crystal was *BEA zeolite. The evaluation results of the *BEA zeolite of this comparative example are shown in Tables 1 and 2.

TABLE 1

| | Crystalline aluminosilicate (raw material) | | | AEI zeolite* | | |
|---|---|---|---|---|---|---|
| | $SiO_2/Al_2O_3$ ratio (mol/mol) | Lattice constant (Å) | Specific surface area (m$^2$/g) | $SiO_2/Al_2O_3$ ratio (mol/mol) | P/T ratio (mol/mol) | Average primary particle size (μm) |
| Example 1 | 32 | 24.33 | 606 | 26 | 0.086 | 0.66 |
| Example 2 | 22 | 24.30 | 661 | 22 | 0.078 | 1.4 |
| Example 3 | 23 | 24.33 | 696 | 18 | 0.081 | 0.80 |
| Example 4 | 26 | 24.32 | 557 | 21 | 0.082 | 0.33 |
| Example 5 | 19 | 24.41 | 382 | 18 | 0.080 | 0.12 |
| Example 6 | 32 | 24.33 | 690 | 25 | 0.085 | 0.20 |
| Example 7 | 22 | 24.30 | 661 | 20 | 0.073 | 0.71 |
| Example 8 | 15 | 24.30 | 650 | 15 | 0.045 | 1.3 |
| Comparative Example 1 | 29 | 24.29 | 586 | 25 | 0.069 | — |
| Comparative Example 2 | 28 | — | 114 | 26 | 0.081 | — |

*Comparative Example 1 is MFI zeolite, Comparative Example 2 is *BEA zeolite

From Table 1, it was ascertained that when crystalline aluminosilicate having a lattice constant of not less than 24.30 Å is used, AEI zeolite is obtained in all cases. Furthermore, from Comparative Examples 1 and 2 it was understood that when the raw material has a lattice constant less than 24.30 Å or low crystallinity, even if it is crystalline aluminosilicate, AEI zeolite is not obtained.

Furthermore, in Example 5, Y zeolite was ascertained for a reaction time of up to 7 days. From Examples 2 and 5, it was ascertained that crystallization of AEI zeolite is accelerated by the specific surface area of the crystalline aluminosilicate raw material being not less than 400 m$^2$/g.

Example 9

An organic structure-directing agent was synthesized according to Example 1 of Patent Literature 1 (U.S. Pat. No. 5,958,370, specification). Specifically, 40 g of 2,6-dimethylpiperidine was dissolved in 250 g of methanol to obtain a methanol solution of 2,6-dimethylpiperidine. Then, 64 g of potassium hydrogen carbonate and 250 g of ethyl iodide were added to this methanol solution, after which it was refluxed while stirring for one week, thereby producing a solid. The obtained solid was filtered out, and the filtrate was mixed with liquid obtained by extracting the separated solid with chloroform, and a solution was obtained. The solvent was removed, and by recrystallization with acetone, N,N-diethyl-2,6-dimethylpiperidinium iodide was obtained. 50 g of the iodide was made into an aqueous solution, and by batch exchange using 500 mL of ion exchange resin (trade name: DIAION SA10A (OH type), manufactured by Mitsubishi Chemical Corp.), a DEDMPOH aqueous solution was obtained.

Then, purified water, sodium hydroxide, and FAU zeolite (Y type; cation type: proton type; $SiO_2/Al_2O_3$ ratio: 22; lattice constant: 24.30 Å), 40% DEDMPOH aqueous solution, and 40% TEPOH aqueous solution were mixed to obtain a raw material mixture with the following composition.

$SiO_2/Al_2O_3$ ratio: 22
Na/$SiO_2$ ratio: 0.10
DEDMP/$SiO_2$ ratio: 0.10
TEP/$SiO_2$ ratio: 0.10
OH/$SiO_2$ ratio: 0.30
$H_2O$/$SiO_2$ ratio: 10

A hermetically sealed container containing the obtained raw material mixture was rotated for 7 days at 150° C., thereby crystallizing the raw material mixture. The raw material mixture after crystallization underwent solid-liquid separation, and after being washed with purified water, it was dried at 70° C. to obtain the zeolite of this example. This zeolite was AEI zeolite composed of a single phase of an AEI structure. The average primary particle size was 0.59 μm, and the crystal shape was cubic. The evaluation results of the AEI zeolite of this example are shown in Table 2.

After that, the AEI zeolite obtained by this example was calcined for 2 hours at 600° C. in air, treated with 20% ammonium chloride, and dried overnight at 110° C. in air. As a result, $NH_4$-type AEI zeolite was obtained. In the obtained AEI zeolite, the $SiO_2/Al_2O_3$ ratio was 22, the P/T ratio was 0.022, and the BET specific surface area was 495 m$^2$/g.

Example 10

AEI zeolite of this example was obtained by the same method as Example 9 except that the raw material mixture had the following composition.

$SiO_2/Al_2O_3$ ratio: 22
Na/$SiO_2$ ratio: 0.10
DEDMP/$SiO_2$ ratio: 0.15
TEP/$SiO_2$ ratio: 0.05
OH/$SiO_2$ ratio: 0.30
$H_2O$/$SiO_2$ ratio: 10

This zeolite was AEI zeolite composed of a single phase of an AEI structure. The average primary particle size was 0.43 μm, and the crystal shape was cubic. The evaluation results of the AEI zeolite of this example are shown in Table 2.

Example 11

AEI zeolite of this example was obtained by the same method as Example 9 except that the raw material mixture had the following composition.

$SiO_2/Al_2O_3$ ratio: 22
Na/$SiO_2$ ratio: 0.10
DEDMP/$SiO_2$ ratio: 0.05
TEP/$SiO_2$ ratio: 0.15
OH/$SiO_2$ ratio: 0.30
$H_2O$/$SiO_2$ ratio: 10

This zeolite was AEI zeolite composed of a single phase of an AEI structure. The average primary particle size was 0.45 μm, and the crystal shape was cubic. The evaluation results of the AEI zeolite of this example are shown in Table 2.

Example 12

AEI zeolite of this example was obtained by the same method as Example 9 except that the raw material mixture had the following composition.

$SiO_2/Al_2O_3$ ratio: 22
Na/$SiO_2$ ratio: 0.10

DEDMP/SiO$_2$ ratio: 0.18
TEP/SiO$_2$ ratio: 0.02
OH/SiO$_2$ ratio: 0.30
H$_2$O/SiO$_2$ ratio: 10

This zeolite was AEI zeolite composed of a single phase of an AEI structure. The average primary particle size was 0.38 μm, and the crystal shape was cubic. The evaluation results of the AEI zeolite of this example are shown in Table 2.

TABLE 2

| | Crystalline aluminosilicate (raw material) | | | AEI zeolite* | | |
|---|---|---|---|---|---|---|
| | SiO$_2$/Al$_2$O$_3$ ratio (mol/mol) | Lattice constant (Å) | Specific surface area | SiO$_2$/Al$_2$O$_3$ ratio (mol/mol) | P/T ratio (mol/mol) | Average primary particle size (μm) |
| Example 9 | 22 | 24.30 | 661 | 22 | 0.022 | 0.59 |
| Example 10 | 22 | 24.30 | 661 | 22 | 0.008 | 0.43 |
| Example 11 | 22 | 24.30 | 661 | 22 | 0.042 | 0.45 |
| Example 12 | 22 | 24.30 | 661 | 22 | 0.003 | 0.38 |
| Comparative Example 1 | 29 | 24.29 | 586 | 25 | 0.069 | — |
| Comparative Example 2 | 28 | — | 114 | 26 | 0.081 | — |

*Comparative Example 1 is MFI zeolite, Comparative Example 2 is *BEA zeolite

Furthermore, from the results of Examples 9 to 12 it was ascertained that the phosphorus content can be controlled in the crystallization step by a raw material mixture containing DEDMP and TEP. Additionally, it was ascertained that the P/T ratio of the AEI zeolite obtained from a raw material mixture containing DEDMP and TEP was lower than that of AEI zeolite obtained from a raw material mixture containing TEP only.

Example 13

After the AEI zeolite obtained in Example 4 was press-molded, agglomerates with an agglomerate size of from 12 mesh to 20 mesh were formed. A ambient-pressure fixed-bed flow reaction tube was charged with 3 g of the obtained agglomerates, and it was heated to 800° C. while circulating nitrogen at 720 mL/min, and was kept at that temperature for 3 hours. After the heat-treated AEI zeolite was treated with 20% ammonium chloride, it was dried overnight at 110° C. in air. After that, it was calcined for 2 hours at 600° C. in air, and again treated with 20% ammonium chloride and dried overnight at 110° C. in air. As a result, NH$_4$-type AEI zeolite was obtained. The BET specific surface area of the obtained AEI zeolite was 487 m$^2$/g. The evaluation results are shown in Table 3.

Example 14

After the AEI zeolite obtained in Example 1 was press-molded, it was pulverized to form agglomerates. A ambient-pressure fixed-bed flow reaction tube was charged with 1 g of the obtained agglomerates, and heat treatment was performed for 3 hours at 700° C. under a nitrogen flow at 50 mL/min. The BET specific surface area of the obtained AEI zeolite was 507 m$^2$/g. The evaluation results are shown in Table 3.

Example 15

Heat treatment was performed by the same method as Example 14 except that the hold time was 12 hours. The BET specific surface area of the obtained AEI zeolite was 519 m$^2$/g. The evaluation results are shown in Table 3.

Example 16

Heat treatment was performed by the same method as Example 14 except that the temperature was 800° C. and the hold time was 3 hours. The BET specific surface area of the obtained AEI zeolite was 510 m$^2$/g. The evaluation results are shown in Table 3.

Example 17

Heat treatment was performed by the same method as Example 14 except that the temperature was 700° C., the hold time was 6 hours, and it was performed under 10$^{-6}$ MPa vacuum instead of nitrogen flow. The P/T ratio was 0.008, and the SiO$_2$/Al$_2$O$_3$ ratio was 25.

Example 18

NH$_4$-type AEI zeolite was obtained by the same method as Example 13 except that heat treatment was performed for 1 hour at 750° C. while gas containing 5 vol % hydrogen and 95 vol % under a nitrogen flow at 720 mL/min. The BET specific surface area of the obtained AEI zeolite was 424 m$^2$/g. The evaluation results are shown in Table 3.

TABLE 3

| | SiO$_2$/Al$_2$O$_3$ ratio (mol/mol) | P/T ratio (mol/mol) | BET specific surface area (m$^2$/g) |
|---|---|---|---|
| Example 13 | 21 | 0.020 | 487 |
| Example 14 | 25 | 0.031 | 507 |
| Example 15 | 25 | 0.033 | 519 |
| Example 16 | 25 | 0.031 | 510 |
| Example 18 | 22 | 0.027 | 424 |

From Table 3, it was ascertained that all of the AEI zeolites have a BET specific surface area of not less than 400 m$^2$/g. Furthermore, it was ascertained that the phosphorus content in AEI zeolite is decreased by heat treatment in a non-oxidizing environment. Note that the phosphorus content did not change from before to after heat treatment in the AEI zeolites of Examples 3 and 9, which were heat-treated in air. As a result, it was ascertained that phosphorus content decreases by heat treatment in a non-oxidizing environment, or further, in a nitrogen environment.

Furthermore, the BET specific surface area after heat treatment under nitrogen gas flow—that is, in an inert environment—was not less than 480 m$^2$/g, which was higher than the BET specific surface area after heat treatment in a reducing environment. Additionally, it was ascertained from Examples 14 to 16 that BET specific surface area tends to increase more by extending the heat treatment time.

Furthermore, it was ascertained that in all AEI zeolites, the P/T ratio after heat treatment decreases up to not greater than 50% relative to the P/T ratio before heat treatment in all cases. As a result, it was ascertained that the phosphorus content of AEI zeolite is decreased by heat treatment in a non-oxidizing environment.

From these results it was ascertained that phosphorus content can be decreased and BET specific surface area can be improved efficiently by heat treatment in an inert environment.

Furthermore, it was ascertained that particularly when the treatment pressure is lower than atmospheric pressure—that is, under reduced pressure—the phosphorus content is greatly decreased and the P/T ratio is decreased up to about 10% relative to before heat treatment. As a result, it was ascertained that by decreasing the treatment pressure, phosphorus can be more efficiently decreased, and, by controlling the treatment pressure, the phosphorus content can be controlled in a wide range.

Next, the AEI zeolite of the present invention was used as metal-containing AEI zeolite, which was evaluated as a nitrogen oxide reduction catalyst. Treatment conditions and evaluation conditions were as follows.

(Hydrothermal Durability Treatment)

After a sample was press-molded, agglomerates with an agglomerate size of from 12 mesh to 20 mesh were formed. A ambient-pressure fixed-bed flow reaction tube was charged with 3 mL of the obtained agglomerates, and hydrothermal durability treatment was performed by allowing air containing 10 vol % $H_2O$ to flow into the tube at 300 mL/min. Hydrothermal durability treatment was performed for 1 hour, 4 hours, or 8 hours at 900° C.

(Nitrogen Oxide Reduction Rate Measurement)

The nitrogen oxide reduction rate of the sample was measured by the following ammonia SCR method.

After a sample was press-molded, agglomerates with an agglomerate size of from 12 mesh to 20 mesh were formed. A reaction tube was charged with 1.5 mL of the obtained agglomerates. A treatment gas of the following composition containing nitrogen oxide was then made to flow into the reaction tube at a temperature of 150° C., 200° C., 300° C., 400° C., or 500° C. Measurements were taken at a treatment gas flow rate of 1.5 L/min and a space velocity (SV) of 60,000 $h^{-1}$.

<Treatment Gas Composition>

NO 200 ppm
$NH_3$ 200 ppm
$O_2$ 10 vol %
$H_2O$ 3 vol %
Balance $N_2$

The nitrogen oxide concentration (ppm) in the treatment gas after catalytic flow relative to the nitrogen oxide concentration (200 ppm) in the treatment gas flowed in the reaction tube was determined, and the nitrogen oxide reduction rate was determined in accordance with the following formula.

Nitrogen oxide reduction rate (%)={1−(nitrogen oxide concentration in treatment gas after catalysis/nitrogen oxide concentration in treatment gas before catalysis)}×100

Example 19

After the AEI zeolite obtained in Example 2 was press-molded, agglomerates with an agglomerate size from 12 mesh to 20 mesh were formed. A ambient-pressure fixed-bed flow reaction tube was charged with 3 mL of the obtained agglomerates, and this was heat-treated for 1 hour at 750° C. under a gas flow at 500 mL/min, the gas containing 5 vol % hydrogen and 95 vol % nitrogen. After heat treatment, the SDA was removed by calcining at 600° C. for 2 hours in air. After the calcined AEI zeolite was treated with 20% ammonium chloride, it was dried overnight at 110° C. in air. As a result, $NH_4$-type AEI zeolite was obtained.

Copper nitrate aqueous solution was added to 2 g of the obtained $NH_4$-type AEI zeolite, and this was mixed in a mortar. Note that as the copper nitrate aqueous solution, a solution prepared by dissolving 139 mg of copper nitrate trihydrate in 0.5 g of purified water was used.

The sample after mixing was dried overnight at 110° C., and then calcined for 1 hour at 550° C. in air, and this was used as the AEI zeolite of this example. The evaluation results of the obtained AEI zeolite are shown in Table 4.

Example 20

The AEI zeolite of this example was obtained by the same method as Example 19 except that the AEI zeolite obtained in Example 3 was used, and the copper nitrate aqueous solution was prepared by dissolving 122 mg of copper nitrate trihydrate in 0.5 g of purified water. The evaluation results of the obtained AEI zeolite are shown in Table 4.

Example 21

$NH_4$-type AEI zeolite was obtained by the same method as Example 19 using the AEI zeolite obtained in Example 4. The BET specific surface area of the obtained AEI zeolite was 424 $m^2$/g. The AEI zeolite of this example was obtained by the same method as Example 19 except that the AEI zeolite was used, and the copper nitrate aqueous solution was prepared by dissolving 109 mg of copper nitrate trihydrate in 0.5 g of purified water. The evaluation results of the obtained AEI zeolite are shown in Table 4.

Example 22

The AEI zeolite of this example was obtained by the same method as Example 19 except that the AEI zeolite obtained in Example 6 was used, and the copper nitrate aqueous solution was prepared by dissolving 72 mg of copper nitrate trihydrate in 0.5 g of purified water. The evaluation results of the obtained AEI zeolite are shown in Table 4.

Example 23

The AEI zeolite of this example was obtained by the same method as Example 19 except that the AEI zeolite obtained in Example 8 was used, and the copper nitrate aqueous solution was prepared by dissolving 124 mg of copper nitrate trihydrate in 0.5 g of purified water. The evaluation results of the obtained AEI zeolite are shown in Table 4.

Example 24

The AEI zeolite obtained in Example 9 was calcined for 2 hours at 600° C. in air. After the calcined AEI zeolite was treated with 20% ammonium chloride, it was dried overnight at 110° C. in air. As a result, $NH_4$-type AEI zeolite was obtained.

Copper nitrate aqueous solution was added to 2 g of the obtained $NH_4$-type AEI zeolite, and this was mixed in a mortar. Note that as the copper nitrate aqueous solution, a solution prepared by dissolving 102 mg of copper nitrate trihydrate in 0.5 g of purified water was used.

The sample after mixing was dried overnight at 110° C., and then calcined for 1 hour at 550° C. in air, and this was used as the AEI zeolite of this example. The evaluation results of the obtained AEI zeolite are shown in Table 4.

Example 25

The AEI zeolite of this example was obtained by the same method as Example 24 except that the AEI zeolite obtained in Example 10 was used, and the copper nitrate aqueous solution was prepared by dissolving 116 mg of copper nitrate trihydrate in 0.5 g of purified water. The evaluation results of the obtained AEI zeolite are shown in Table 4.

Example 26

The AEI zeolite of this example was obtained by the same method as Example 24 except that the AEI zeolite obtained in Example 11 was used, and the copper nitrate aqueous solution was prepared by dissolving 113 mg of copper nitrate trihydrate in 0.5 g of purified water. The evaluation results of the obtained AEI zeolite are shown in Table 4.

Example 27

The AEI zeolite of this example was obtained by the same method as Example 24 except that the AEI zeolite obtained in Example 12 was used, and the copper nitrate aqueous solution was prepared by dissolving 111 mg of copper nitrate trihydrate in 0.5 g of purified water. The evaluation results of the obtained AEI zeolite are shown in Table 4.

Example 28

Copper nitrate aqueous solution was added to 2 g of the AEI zeolite obtained in Example 13, and this was mixed in a mortar. Note that as the copper nitrate aqueous solution, that prepared by dissolving 106 mg of copper nitrate trihydrate in 0.5 g of purified water was used. The sample after mixing was dried overnight at 110° C., and then calcined for 1 hour at 550° C. in air, and this was used as the AEI zeolite of this example. The $SiO_2/Al_2O_3$ ratio was 21, the P/T ratio was 0.020, the Cu/Al ratio was 0.18, and the (P+2Cu)/Al ratio was 0.58.

Comparative Example 3

Purified water, sodium hydroxide, FAU zeolite (Y type; cation type: ammonium type; $SiO_2/Al_2O_3$ ratio: 5.5), and no. 3 sodium silicate were added to an aqueous solution of 20% N,N-dimethyl-3,5-dimethylpiperidinium hydroxide ("DMPOH" hereinafter), and mixed to produce a raw material mixture having the following molar composition.

$SiO_2/Al_2O_3$ ratio: 31
$Na/SiO_2$ ratio: 0.53
$DMPOH/SiO_2$ ratio: 0.16
$OH/SiO_2$ ratio: 0.69
$H_2O/SiO_2$ ratio: 46

A hermetically sealed container containing the obtained raw material mixture was rotated for 15 days at 135° C., thereby crystallizing the raw material mixture. Solid-liquid separation, washing, and drying were performed by the same method as Example 1, and AEI zeolite was obtained.

The obtained AEI zeolite was calcined for 2 hours at 600° C. in air. After the calcined AEI zeolite was treated with 20% ammonium chloride, it was dried overnight at 110° C. in air. As a result, $NH_4$-type AEI zeolite was obtained.

Copper nitrate aqueous solution was added to 2 g of the obtained $NH_4$-type AEI zeolite, and this was mixed in a mortar. Note that as the copper nitrate aqueous solution, a solution prepared by dissolving 282 mg of copper nitrate trihydrate in 0.5 g of purified water was used.

The sample after mixing was dried overnight at 110° C., and then calcined for 1 hour at 550° C. in air, and this was used as the AEI zeolite of this comparative example. The evaluation results of the obtained AEI zeolite are shown in Table 4.

TABLE 4

| | $SiO_2/Al_2O_3$ ratio (mol/mol) | P/T ratio (mol/mol) | Cu/Al ratio (mol/mol) | (P + 2Cu)/Al |
|---|---|---|---|---|
| Example 19 | 19 | 0.024 | 0.20 | 0.65 |
| Example 20 | 18 | 0.030 | 0.17 | 0.64 |
| Example 21 | 22 | 0.027 | 0.19 | 0.69 |
| Example 22 | 26 | 0.027 | 0.13 | 0.64 |
| Example 23 | 15 | 0.011 | 0.14 | 0.37 |
| Example 24 | 22 | 0.022 | 0.18 | 0.61 |
| Example 25 | 22 | 0.008 | 0.18 | 0.45 |
| Example 26 | 22 | 0.042 | 0.18 | 0.85 |
| Example 27 | 22 | 0.003 | 0.18 | 0.39 |
| Example 28 | 21 | 0.020 | 0.18 | 0.58 |
| Comparative Example 3 | 11 | 0 | 0.27 | 0.53 |

Measurement Example 1

The AEI zeolites of Examples 19 to 21, Examples 23 to 27, and Comparative Example 3 each underwent hydrothermal durability treatment for 1 hour.

The nitrogen oxide reduction characteristics at 150° C. and 200° C. were evaluated for the AEI zeolites before hydrothermal durability treatment and the AEI zeolites after hydrothermal durability treatment. The results are shown in Table 5.

TABLE 5

| | Nitrogen oxide reduction rate (%) | | | |
|---|---|---|---|---|
| | 150° C. | | 200° C. | |
| | Before hydrothermal durability treatment | After hydrothermal durability treatment | Before hydrothermal durability treatment | After hydrothermal durability treatment |
| Example 19 | 30 | 45 | 74 | 84 |
| Example 20 | 16 | 38 | 52 | 87 |
| Example 21 | 15 | 41 | 43 | 84 |
| Example 23 | 54 | 34 | 83 | 78 |
| Example 24 | 25 | 51 | 73 | 91 |
| Example 25 | 38 | 33 | 87 | 83 |
| Example 26 | 15 | 25 | 47 | 76 |
| Example 27 | 60 | 30 | 91 | 77 |
| Comparative Example 3 | 62 | 4 | 83 | 39 |

From Table 5, it was ascertained that the AEI zeolites of the examples had a high nitrogen oxide reduction rate at 200° C. and 150° C. even after hydrothermal durability treatment for 1 hour. Furthermore, there were also cases where the nitrogen oxide reduction rate improved after the hydrothermal durability treatment.

Additionally, for AEI zeolites having a P/T ratio of not less than 0.02 and not greater than 0.03, the nitrogen oxide reduction rate at 150° C. was especially high even after hydrothermal durability treatment for 1 hour and for 4 hours.

In contrast, it was ascertained from Comparative Example 3 that with conventional AEI zeolite, the nitrogen oxide reduction rates at 200° C. and 150° C. in the state before hydrothermal durability treatment were a high 83% and 62%, respectively. However, it was understood that the nitrogen oxide reduction rates of the AEI zeolite decreased markedly when it underwent 1 hour of hydrothermal durability treatment.

As a result, it was ascertained that the AEI zeolite of the present invention has a high nitrogen oxide reduction rate after being exposed to a high-temperature, high-humidity environment even at a low temperature not greater than 200° C., or further, not greater than 150° C.

Measurement Example 2

The AEI zeolites of Examples 19 to 27 each underwent hydrothermal durability treatment for 4 hours. The nitrogen oxide reduction characteristics at 150° C. and 200° C. were evaluated for the AEI zeolites before hydrothermal durability treatment and the AEI zeolites after hydrothermal durability treatment. The results are shown in Table 6.

TABLE 6

| | Nitrogen oxide reduction rate (%) | | | |
|---|---|---|---|---|
| | 150° C. | | 200° C. | |
| | Before hydrothermal durability treatment | After hydrothermal durability treatment | Before hydrothermal durability treatment | After hydrothermal durability treatment |
| Example 19 | 30 | 47 | 74 | 87 |
| Example 20 | 16 | 39 | 52 | 87 |
| Example 21 | 15 | 40 | 43 | 83 |
| Example 22 | 11 | 22 | 33 | 67 |
| Example 23 | 54 | 20 | 83 | 52 |
| Example 24 | 25 | 46 | 73 | 90 |
| Example 25 | 38 | 30 | 87 | 76 |
| Example 26 | 15 | 28 | 47 | 75 |
| Example 27 | 60 | 19 | 91 | 50 |

The nitrogen oxide reduction rates of Example 20 after hydrothermal durability treatment for 1 hour and 4 hours were 87% and 87%, respectively, at 200° C. and 38% and 39%, respectively, at 150° C. It was ascertained that the AEI zeolite of the present invention does not decrease in nitrogen oxide reduction rate even in a state where a higher thermal load is applied.

Additionally, it was ascertained that AEI zeolite with a P/T ratio greater than 0.011 tended to have a higher nitrogen oxide reduction rate at 200° C. after the hydrothermal durability treatment. Furthermore, from Table 6, it was ascertained that AEI zeolite having a P/T ratio of not less than 0.02 did not tend to decrease in nitrogen oxide reduction rate at either 150° C. or 200° C. form before to after that hydrothermal durability treatment.

Measurement Example 3

The AEI zeolites of Examples 19 to 27 each underwent hydrothermal durability treatment for 4 hours. The nitrogen oxide reduction characteristics at 300° C., 400° C., and 500° C. were evaluated for the AEI zeolites before hydrothermal durability treatment and the AEI zeolites after hydrothermal durability treatment. The results are shown in Table 7.

TABLE 7-I

| | Nitrogen oxide reduction rate (%) | | | | | |
|---|---|---|---|---|---|---|
| | 300° C. | | 400° C. | | 500° C. | |
| | Before hydrothermal durability treatment | After hydrothermal durability treatment | Before hydrothermal durability treatment | After hydrothermal durability treatment | Before hydrothermal durability treatment | After hydrothermal durability treatment |
| Example 19 | 90 | 95 | 96 | 93 | 96 | 89 |
| Example 20 | 85 | 96 | 96 | 95 | 97 | 92 |
| Example 21 | 83 | 95 | 95 | 92 | 96 | 89 |
| Example 22 | 77 | 91 | 91 | 87 | 91 | 85 |
| Example 23 | 94 | 86 | 97 | 82 | 95 | 76 |
| Example 24 | 91 | 97 | 97 | 95 | 97 | 91 |
| Example 25 | 95 | 95 | 98 | 91 | 98 | 86 |
| Example 26 | 87 | 92 | 97 | 90 | 94 | 83 |
| Example 27 | 95 | 88 | 98 | 81 | 96 | 76 |

From Table 7, it was ascertained that the nitrogen oxide reduction rate of the AEI zeolite of the present invention before hydrothermal durability treatment was not less than 80% at 300° C., and not less than 90% at 400° C. and 500° C.

As a result, it was ascertained that the AEI zeolite of the present invention exhibits a high nitrogen oxide reduction rate not only in the low-temperature region of 200° C. or below, but also in the high-temperature region of 300° C. to 500° C.

Measurement Example 4

The AEI zeolite of Example 19 underwent hydrothermal durability treatment for 4 hours or 8 hours. The nitrogen oxide reduction characteristics at 150° C., 200° C., 300° C., 400° C., and 500° C. were evaluated for the AEI zeolites before hydrothermal durability treatment and the AEI zeolites after hydrothermal durability treatment. The results are shown in Table 8.

TABLE 8

| | Nitrogen oxide reduction rate (%) | | |
|---|---|---|---|
| | Before hydrothermal durability treatment | 4 h | 8 h |
| 150° C. | 30 | 47 | 45 |
| 200° C. | 74 | 87 | 87 |
| 300° C. | 90 | 95 | 96 |
| 400° C. | 96 | 93 | 96 |
| 500° C. | 96 | 89 | 91 |

From Table 8, it was ascertained that the AEI zeolite of the present invention exhibits a high nitrogen oxide reduction rate in a wide range from 150° C. to 500° C. Furthermore, it was ascertained that the nitrogen oxide reduction rate did not decrease at any temperature, even after 8 hours of hydrothermal durability treatment.

Additionally, it was ascertained that high nitrogen oxide reduction characteristics of not less than 30%, and further, not less than 40% were exhibited even at a low temperature of 150° C.

Measurement Example 5

The AEI zeolites obtained in Examples 21 and 28 underwent hydrothermal durability treatment for 1 hour and 4 hours. The nitrogen oxide reduction characteristics of the AEI zeolite of Example 21 at 150° C. and 200° C. before and after hydrothermal durability treatment are shown in Table 9. The nitrogen oxide reduction characteristics of the AEI zeolite of Example 28 at 150° C. and 200° C. before and after hydrothermal durability treatment are shown in Table 10.

TABLE 9

| | Nitrogen oxide reduction rate (%) | | |
|---|---|---|---|
| | Before hydrothermal durability treatment | 1 h | 4 h |
| 150° C. | 15 | 41 | 40 |
| 200° C. | 33 | 84 | 83 |

TABLE 10

| | Nitrogen oxide reduction rate (%) | | |
|---|---|---|---|
| | Before hydrothermal durability treatment | 1 h | 4 h |
| 150° C. | 32 | 49 | 44 |
| 200° C. | 75 | 89 | 88 |

In both Examples 21 and 28, AEI zeolite of Example 4 that had been heat-treated was used. From these tables it was ascertained that the nitrogen oxide reduction rate at both 150° C. and 200° C. increased from before to after hydrothermal durability treatment due to heat treatment in an inert environment. It was ascertained that the nitrogen oxide reduction rate before hydrothermal durability treatment increased due to heat treatment in an inert environment.

INDUSTRIAL APPLICABILITY

The AEI zeolite of the present invention is anticipated to be used as a catalyst for lower olefin production from alcohols and ketones, a cracking catalyst, a dewaxing catalyst, an isomerization catalyst, and an exhaust gas nitrogen oxide reduction catalyst. Additionally, the AEI zeolite of the present invention may be used as a nitrogen oxide reduction catalyst.

The invention claimed is:

1. AEI zeolite comprising phosphorus wherein the AEI zeolite is crystalline aluminosilicate, containing phosphorous in the pores.

2. The AEI zeolite according to claim 1, wherein a molar ratio of phosphorus relative to framework metal is not less than 0.001 and not greater than 0.1.

3. The AEI zeolite according to claim 1, wherein a molar ratio of silica relative to alumina is not less than 10 and not greater than 35.

4. The AEI zeolite according to claim 1, comprising a transition metal.

5. The AEI zeolite according to claim 4, wherein the transition metal is at least any one of iron and copper.

6. The AEI zeolite according to claim 4, wherein a molar ratio of the transition metal relative to aluminum is not less than 0.1 and not greater than 0.5.

7. A method for producing the AEI zeolite described in claim 1, comprising a crystallization step of crystallizing a raw material mixture containing a tetraethylphosphonium cation and FAU crystalline aluminosilicate having a lattice constant of not less than 24.30 Å.

8. The method for producing the AEI zeolite according to claim 7, wherein a compound containing a tetraethylphosphonium cation is at least one selected from the group consisting of tetraethylphosphonium hydroxide, tetraethylphosphonium bromide, and tetraethylphosphonium chloride.

9. The method for producing the AEI zeolite according to claim 7, wherein the FAU crystalline aluminosilicate is Y zeolite.

10. The method for producing the AEI zeolite according to claim 7, comprising a step of heat-treating AEI zeolite in a non-oxidizing environment.

11. The method for producing the AEI zeolite according to claim 10, wherein the non-oxidizing environment is at least any one of a nitrogen environment and an environment containing from 1 to 10 volume % hydrogen.

12. A catalyst comprising the AEI zeolite described in claim 1.

13. A nitrogen oxide reduction catalyst comprising the AEI zeolite described in claim 1.

14. A method for reducing nitrogen oxide comprising contacting the AEI zeolite of claim 1 with nitrogen oxide.

* * * * *